July 15, 1947. R. J. McNITT 2,424,179
METHOD AND APPARATUS FOR PURIFYING A MOLTEN LIGHT
METAL BY PRECIPITATION OF IMPURITIES
Filed Oct. 15, 1941 3 Sheets-Sheet 2
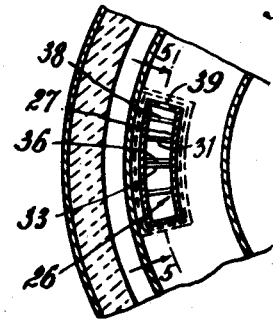
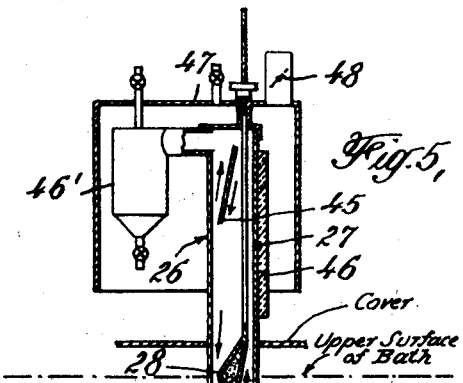
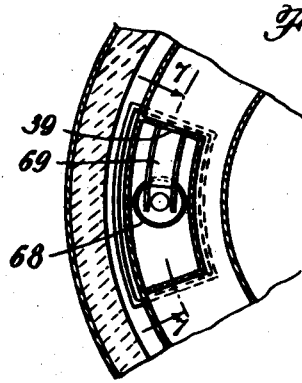
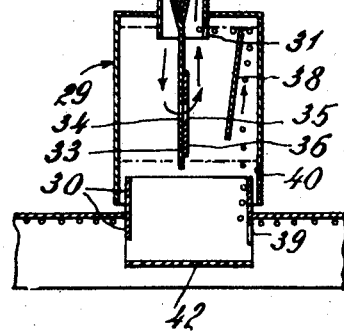
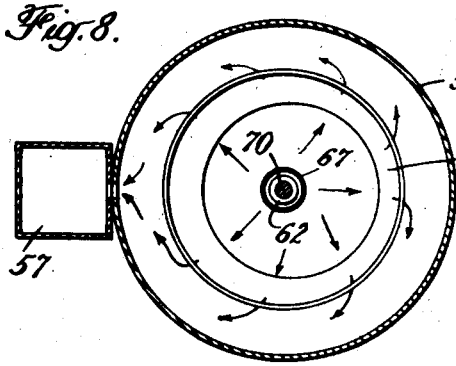
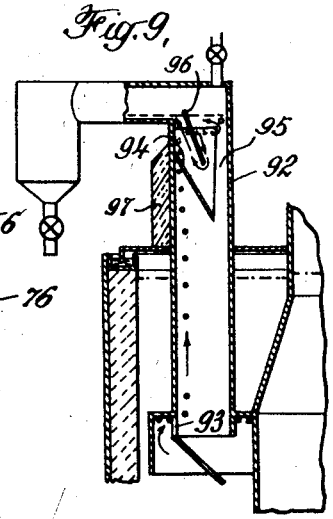
INVENTOR
Robert J. McNitt
BY
ATTORNEYS

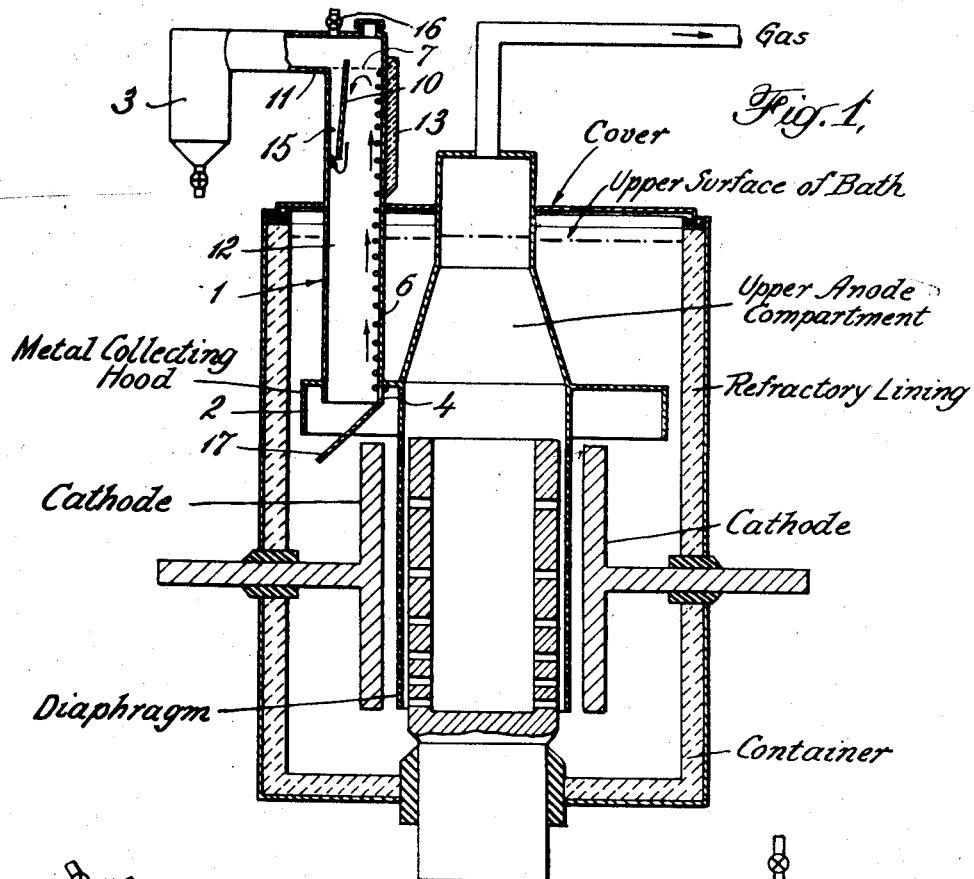
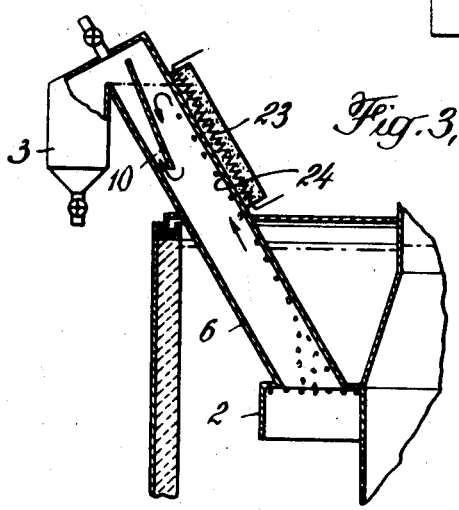
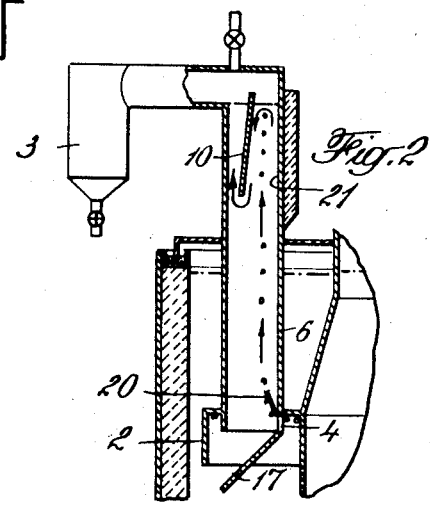

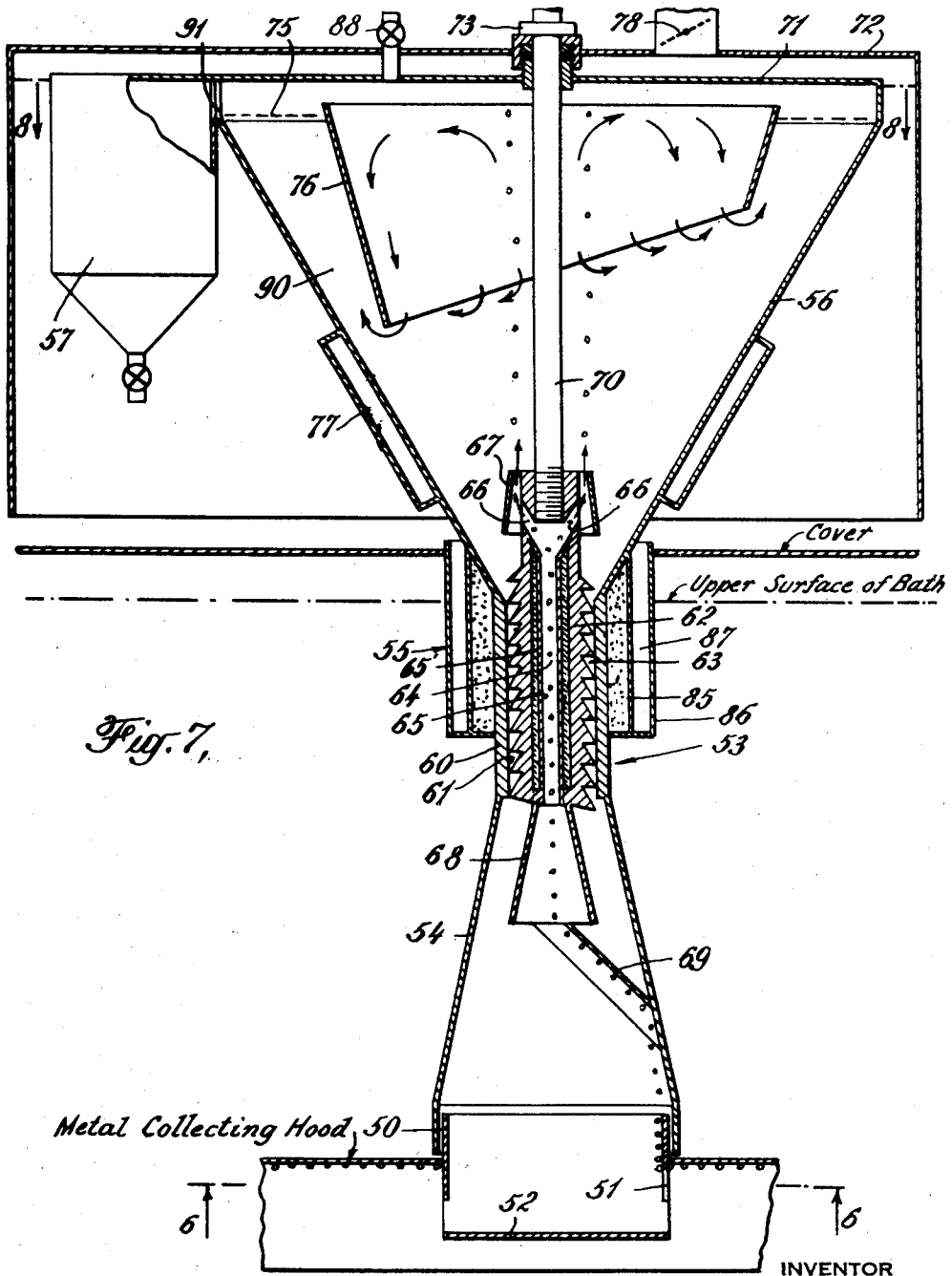

Patented July 15, 1947

2,424,179

UNITED STATES PATENT OFFICE 2,424,179

METHOD AND APPARATUS FOR PURIFYING A MOLTEN LIGHT METAL BY PRECIPITATION OF IMPURITIES

Robert J. McNitt, Perth Amboy, N. J.

Application October 15, 1941, Serial No. 415,095

19 Claims. (Cl. 210—51)

This invention relates to the recovery of light metals from a fused bath which is more dense than the metal. It pertains particularly to the recovery of light metals which are produced by chemical or electro-chemical action in baths of fused salts and to the recovery of light metals from fused baths in which the metals have been placed for purification.

The invention is of special advantage when applied to the recovery of metals which have a melting point far below the temperature of the bath from which the metals are recovered and which contain impurities which are held in solution at the temperature of the fused bath but are thrown out of solution at temperatures near the melting point of the metal and, being more dense than the metal, may be separated therefrom by sedimentation.

In a method widely used for the recovery of these metals, globules are collected under a hood submerged in the fused bath and led to an opening in the roof of the hood connecting with the lower end of a pipe (hereinafter called the "delivery duct") which extends upright through the upper surface of the bath. The globules of metal collected under the hood coalesce into a mass of crude metal which by reason of its low specific gravity rises above the upper surface of the bath in the delivery duct and at the upper part of the duct overflows into a receiver for the metal as fast as the metal is collected under the submerged hood. Above the upper surface of the bath the outside of the delivery duct is exposed to the air and the metal rising therein is cooled sufficiently by conduction of heat through the wall of the duct to precipitate most of the impurities which are dissolved in the crude metal. The precipitated impurities fall back through the delivery duct into the bath.

This method has not been entirely satisfactory. Particles of the molten bath and mixtures of metal and impurities which are carried up into the delivery duct with the light metal congeal as the metal comes in contact with the cool upper wall of the delivery duct and a cement-like mass including metal, salt and other impurities forms accretions on the wall of the duct, which must be removed by scrapers to prevent the obstruction from completely blocking the upward flow of metal. Even with the use of scrapers blockages occur which seriously restrict the flow of metal and make necessary the replacement of the duct. This difficulty causes considerable expense and through frequent operation of the scraper in the small duct interferes with the settling back into the bath of the sedimentary impurities. Due to the difference in temperature between the metal in the lower part of the delivery duct which is submerged in the bath and the metal in the upper part of the duct, thermal convection currents circulate between the lower and upper parts of the duct carrying much excess heat into the upper part of the duct which must be dissipated by cooling the wall. The agitation produced by these currents in the metal interferes with the sedimentation of impurities.

Another source of interference with sedimentation lies in the gas which appears in the fused bath and is collected with the crude metal. This gas, for example hydrogen, enters the delivery duct with the metal and rising through the column in bubbles not only interferes with the return of sedimentary impurities to the bath but sometimes carries slugs of the crude metal and masses of impurities over into the receiver.

As the diameter of the delivery duct is made greater to take care of an increased flow of metal, the difficulties increase since the flow of heat into the column of metal in the duct from the fused bath depends to a large extent on the cross-sectional area of the duct, whereas the cooling surface of the duct wall increases in proportion to the diameter. Thus, in the larger duct, the mean temperature of the metal in the duct will be found at a point higher up and more intense cooling must be applied at the upper end of the duct resulting in more trouble from accretions and less opportunity for thorough sedimentation of impurities.

This invention aims to avoid these difficulties and to provide an improved method and apparatus to remove impurities from the metal in its passage from the bath to a receiver. I have found that if the temperature of the crude metal entering the delivery duct be lowered by contact with a cooler body of metal instead of by contact with the cool wall of the duct, the dissolved impurities are precipitated out in the metal and may be removed together with particles of salt and other impurities by sedimentation without the formation of accretions on the wall of the duct.

The invention aims to provide a relatively quiescent and cool body of metal above the bath and to flow hot crude metal collected in the bath upward in a stream through and over the cool metal to precipitate dissolved impurities. The precipitated impurities settle out of the stream and return to the bath in relatively quiescent metal.

In accordance with a method of my invention, I direct or guide the rising stream of metal and any gas which may accompany it upward in a fairly well defined stream in a body of metal extending above the bath and return the impurities to the bath in another part of the metal where the metal is relatively quiescent or moving downward. The impurities are returned to the bath in the metal but are out of interfering contact with the rising stream of metal. In one application of my invention, I direct the hot metal upward in a stream and induce a return flow of metal and accompanying impurities to the bath.

The invention aims to suppress the flow of heat from the bath up through the column of metal in the delivery duct, thus reducing the quantity of heat which must be dissipated in lowering the temperature of the metal to the desired point before it overflows into the receiver and reducing the agitation caused by powerful thermal convection currents in the column of metal in the duct. In one application of this embodiment of my invention, I reduce the cross-sectional area of the metal in the lower portion of the duct to increase the resistance to the flow of heat to upper portions of the metal in the duct. I may accomplish this resistance to the flow of heat by confining a portion of the duct to a small opening as by the use of an orifice of the desired small area.

In another application of the invention I decrease the temperature of the metal in the lower portion of the duct to such an extent that the flow of heat into the upper part of the duct is effectively suppressed, thermal convection currents minimized, and cooling of the metal to a point where soluble impurities precipitate facilitated.

In accordance with my invention, I may suppress the flow of heat up through the column of metal at a place immediately above the upper surface of the bath, or just above the cover, if the bath is covered, or at places below the upper surface of the bath. In suppressing the flow of heat at a place below the cell cover or below the upper surface of the bath, places where heat normally flows into the metal through the wall of the duct, I surround the duct with a thermal insulation to reduce to a minimum the lateral flow of heat into the duct and permit the heat suppressing means of the invention to be used at low positions and the advantages of the invention to be realized with less upward extension of the delivery duct.

Another aim of the invention is to prevent the hot crude metal which rises in the delivery duct from flowing directly to the receiver. I prefer to flow the crude metal downward as it approaches its minimum temperature and then change the direction, flowing the metal upward at a very slow rate and practically free from agitation until it overflows into the receiver. I also prefer to prevent the hot crude metal from flowing in contact with the cold walls of the duct, and to this end, I may insulate or heat the duct to keep it warm, or I may use a baffle to direct the hot metal away from the cold wall.

Another aim of the invention is to provide means for gas collected with the metal under the hood to rise through the duct and be separated from the metal without coming in contact with the purified metal and without causing such agitation in the metal as to interfere with the removal of impurities by sedimentation.

In one advantageous embodiment of my invention, I subject the metal rising from the hood to a preliminary purification comprising a separation of sedimentary impurities and their return to the bath before the metal reaches the upper cooler delivery duct. In this way I remove a part of the impurities before the metal flows above the bath.

The invention aims to provide various arrangements and forms of apparatus in combination with a fused bath to control the temperature of the metal in the duct delivering metal from the hood to a receiver, and the separation of impurities and their return to the bath. My invention involves the use of controlled and constricted passageways, the use of baffles to guide the flow of metal and impurities and the application of heat and thermal insulation to various parts of the delivery duct to prevent surface chilling and the formation of accretions at places where accretions would otherwise form.

These and other novel features of the invention will be better understood after considering the following discussion taken in conjunction with the accompanying drawings, in which:

Fig. 1 shows a vertical sectional view through the center of an electrolytic cell embodying the invention;

Figs. 2 and 3 are fragmentary vertical sectional views illustrating other embodiments of the invention taken in a place similar to that of Fig. 1;

Fig. 4 is a horizontal sectional view from below the collecting hood illustrating another form of the invention;

Fig. 5 is the development of a vertical sectional view along the line 5—5 of Fig. 4;

Fig. 6 is a horizontal sectional view from below the collecting hood illustrating another form of the invention;

Fig. 7 is the development of a vertical sectional view along the line 7—7 of Fig. 6;

Fig. 8 is a horizontal sectional view from above along the line 8—8 of Fig. 7, and Fig. 9 is a fragmentary vertical sectional view illustrating other embodiments of the invention taken in a plane similar to that of Fig. 1.

I shall describe my invention as applied to the production of sodium by the electrolysis of a fused mixed bath of sodium chloride and calcium chloride. In this invention the liquid sodium metal which is liberated at the cathode surface is collected under a hood submerged below the surface of the bath.

The electrolytic cell illustrated in the drawings is of the type comprising a container for a fused salt bath, a carbon anode, an annular cathode surrounding the anode, a diaphragm, an enclosed upper anode compartment wherein the chlorine gas is collected, and a metal collecting hood beneath the upper surface of the bath and above the cathode.

The apparatus illustrated in Fig. 1 comprises a delivery duct 1 preferably of rectangular cross-sectional area connecting the metal collecting hood 2 with a receiver 3. The lower end of the duct 1 extends a short distance below the lower surface of the roof of collector 2 serving as a baffle and this extension contains a narrow slot 4. When electric current flows between the anode and cathode, globules of liquid sodium rise from the cathode and are collected under hood 2 coalescing into a layer of metal which together with any gas which is collected under the hood flows through slot 4 and rises up the side 6 of the duct in a stream, as shown by the arrows, and overflows into receiver 3. The overflow into the receiver corresponds to the amount of crude metal admitted to the duct. Initially, I prefer to fill the duct with liquid sodium through the opening at valve 16 to keep the molten bath from rising in the duct.

The stream of rising crude metal is cooled by passing through the cooler metal in the duct and the cooling of the sodium continues after the metal reaches the top of the duct spreading out over the surface at 7 and reaches a temperature in the vicinity of its melting point by the time it descends to the bottom of baffle 10 and starts upward toward the overflow 11 on the other side of the baffle 10. With the decrease in temperature dissolved impurities are precipitated from the incoming hot crude metal into the cooler metal through which it flows in rising to the top of the duct and over which it flows in descending to the bottom of baffle 10. There is a definite downward flow at the side 12 opposite the side on which the crude metal and gas rise which facilitates the return of impurities to the bath.

I prefer to cover the wall of the duct which is adjacent the side along which the crude metal and gas rise with thermal insulation 13. As this part of the wall has little cooling effect, there is much less tendency to the formation of hard accretions thereon. Since practically all dissolved impurities are precipitated before the metal ascends in the space 15 behind baffle 10, no accretions form on that wall. Accretions which form on the other parts of the wall are of a soft mushy nature and generally slide downward without the application of scrapers after they accumulate to a small thickness. Gas being directed up one side only, causes no agitation which seriously interferes with sedimentation. Gas escapes by valve 16. Baffle 17 prevents gas from entering the delivery duct at any point except by way of slot 4, thus avoiding the possibility of the gas interfering with sedimentation or actually carrying slugs of impure metal over into the receiver.

In the modified form of delivery duct shown in Fig. 2, baffle 20 serves to deflect the incoming crude metal so that it rises through the cooler metal at some distance from the duct wall 21, thus reducing still farther the tendency toward the formation of accretions on the cell wall.

In the form of delivery duct shown in Fig. 3, the hot crude sodium and accompanying gas are made to flow through and over the cooler metal by inclining the duct a little in the direction of the receiver. I prefer to use a rectangular duct in this form of the invention and place it in such a position that the crude metal will rise under one of the short sides. If the rate of metal recovery is low, I prefer to apply heat by the electric heater 23 to the outer surface 24 of the wall along which the crude metal rises, as shown by the arrows. By applying heat there is less tendency for the formation of accretions on this wall.

Figs. 4 and 5 show a delivery duct 26 having an upper portion 27 preferably of rectangular cross-section, the length of which is considerably greater than the width and having mounted within it an adjustable thermal insulating baffle 28 which supresses the flow of heat upward through the metal in the duct by constricting the effective cross-sectional area of the metal where the baffle is placed.

By means of the thermal insulating baffle 28, it is possible to control to a large extent thermal convection currents in the metal above the baffle, and by reducing the agitation in the metal by these convection currents, the separation and return to the bath of sedimentary impurities is facilitated. By suppressing the flow of heat from the bath upward into the delivery duct, less cooling is required at the walls of the duct, thus reducing the possibility of objectionable accretions forming on the walls when the rate of metal recovery is temporarily higher than normal.

The lower portion 29 of the delivery duct is also preferably rectangular in cross-section but considerably larger than the upper part 26 and is fitted over the collar 30 of the collecting hood, the depending part of which serves as a baffle. Part 26 extends into part 29 and has a slit 31 for permitting gas to enter on one side to avoid agitating the metal in part 29. The baffle 28 has a depending plate 33 with a hole 34 registering with the hole 35 in the plate 36 which is suspended from above on an adjustable rod (not shown). The baffle 38 directs the rising metal and gas from slit 39 along side 40. The depending collar 30 serves as a baffle forcing the metal and gas to enter the duct through slit 39 and the baffle 42 prevents gas from passing directly up into the delivery duct. The lower portion 29, as constructed and arranged, serves as a preliminary purification chamber.

Preliminary purification, as carried out in accordance with my invention, reduces the amount of salt which must be separated from the metal in the upper part of the duct, thus rendering less likely the formation of accretions on the walls. By sliding plate 36 over the surface of baffle 33 by means of the rod passing up through the cover of the duct, openings 34 and 35 in the two plates may be made to register more or less completely, thus varying the size of the opening and affording a means of controlling the circulation by thermal convection of a stream of hot metal flowing upward past the baffle 28 into the upper part of the duct and a downward flowing return stream of cooler metal, bearing impurities flowing from the upper part of the duct past the baffle 28 into the lower part of the duct, as shown by the arrows.

The lower part 29 is entirely below the upper surface of the bath and serves largely for the removal of material, such as salt, or other material, which settle out better at a high temperature. Other functions include the upward controlled flow of gas in the space between baffle 38 and wall 40, and its lateral flow across the quiet metal into the slit 31. The upper part 27 of the duct has a baffle 45 for changing the direction of flow of metal, as shown by the arrows, and a layer of thermal insulation 46 extending upward from the cover to prevent the formation of accretions. The upper part 27 and receiver 46' are covered with a housing 47 to control the temperature of the air contacting these parts of the apparatus. By means of a damper 48, the draft of air through the housing may be varied to control the temperature so that the temperature of the duct wall will not fall below the melting point of the metal.

In the form of apparatus illustrated in Figs. 6, 7 and 8, the metal collecting hood has a collar 50 comprising a baffle extending into the bath which directs the gas and metal into the slit 51. The gas is prevented from rising from the bath and entering the collar by means of an inclined baffle 52. The delivery duct 53 is set over the collar 50 where it extends above the metal collecting hood. The delivery duct, as shown, comprises three principal portions, a lower conical portion 54 which tapers upwardly from the collar 50 to an intermediate portion 55 of considerably constricted cross-sectional area, preferably located in the vicinity of the upper surface of the bath, and an upper conical or hopper shape portion 56 which connects to the metal receiver 57.

The intermediate portion 55 comprises a relatively thick iron cylinder 60 having a smooth cylindrical bore 61 into which a conveyor 62 is closely fitted. The conveyor has an exterior helical duct 63 which, as shown, is preferably in the form of a thread having a low pitch. This duct forms a communicating helical passageway between the inside of the hopper 56 with the inside of the lower portion 54. The inner portion of the conveyor 63 has a central duct 64 lined with an iron tube 65 which protects a layer of insulating material 65' against the conveyor to decrease the flow of heat through the metal wall of the conveyor. The upper part of the duct 64 connects with passages 66 which open into the annular space formed between the conveyor and the conical baffle 67. The lower part of duct 64 opens into a depending conical baffle 68 which is attached to the conveyor. A trough-like baffle 69 is removably attached to the lower portion 54 and arranged to discharge gas into the central portion of the baffle 68. The conveyor is attached at the upper end to a shaft 70 which passes upward through the cover 71 of the hopper 56 and the top of the housing 72. The shaft 70 is mounted in a thrust bearing 73 having a packing gland for preventing infiltration of air. By any suitable means not shown, such as a hand wheel or a system of reduction gears operated by an electric motor, the shaft 70 may be rotated as desired.

At the upper surface of metal 75 in the hopper, I mount a frusto-conical baffle 76, the lower edge of which is cut on a slope giving a greater length of baffle on the side where the metal overflows from the upper portion 56 into the metal receiver 57 than on the opposite side.

Near the lower portion of the hopper 56, I may provide a jacket 77 to circulate therein an oil or other heat exchange medium to control the temperature as desired.

I have found it advantageous to cover the upper portion 56 of the duct and the metal receiver 57 with a housing 72 to control the temperature of the air in contact with these parts of the apparatus. I may leave the bottom of the housing open so that the hot air rising from the cell will flow into the housing. By means of damper 78 the flow of air through the housing may be regulated and in this way the desired temperature attained. By suitably adjusting the damper, I may maintain the temperature of the air in contact with the delivery duct as desired. I have found that when the temperature of the wall of hopper 56 is in the neighborhood of 110° C. the results are very effective.

In order to prevent an excessive flow of heat from the bath into the intermediate part 55 of the duct, I surround it with a jacket 85 which is filled with diatomaceous earth and a spaced wall 86 which forms a space 87 in which I may circulate a cooling fluid.

In carrying out a method of the invention in the form of apparatus illustrated in Figs. 7 and 8, the metal and gas collected under the hood are forced to enter the slit 51 where they flow upward into contact with the baffle 69 which directs them through the baffle 68, duct 64, passages 66, and upward in the direction of the arrows through the central portion of the hopper 56 to the upper surface of the metal 75 where it spreads out being hotter and less dense than the metal below. The gas separates from the metal and may escape through the valve controlled opening 88. The hot metal flows more or less laterally and in a radial direction, as shown by the arrows, over the relatively quiescent and cooler metal beneath and then downward along the inside of the baffle 76, around the lower edge of the baffle 76 and upward to the surface 75.

The metal has a temperature in the vicinity of its melting point at the bottom of baffle 76 and rises between the baffle and the wall of the duct through passage 90 flowing toward the outlet 91 where it overflows into the receiver. By flowing the hot crude metal to the top of the duct and limiting thermal convection currents in the metal in the upper part of the duct by the suppression of the flow of heat and controlling the convection currents between the lower and upper parts of the duct, the crude metal is cooled and relieved of its impurities while in a mass of metal and out of contact with the walls of the duct, thus avoiding objectionable accretions on the walls. The crude metal falls from the top of the duct in layers as it cools and reaches its minimum temperature in the vicinity of the bottom of the baffle 76 and tends to increase slightly in temperature in rising through passage 90, thus becoming somewhat more fluid which facilitates the separation of the last traces of sedimentary impurities. I may, however, make the baffle 76 in the form of a thermal insulator by using two layers of steel separated by a thermal insulating material, such as a gas or asbestos or mineral wool, and carefully control the temperature of the outside wall 56. I may cause the metal to reach its minimum temperature as it rises through passage 90. I make the side of the baffle 76 which is adjacent the outlet 91 extend lower down than on other sides to induce a more gradual and uniformly slow flow of the crude metal toward the outlet 91, thus better utilizing the volume and cross-section of the enlarged upper part of the duct.

As the metal flows from the center laterally and radially over relatively cool and quiescent metal, most of the dissolved impurities are precipitated and fall downward. As the metal flows under the baffle 76 and reverses its direction, the relatively heavy particles of impurities continue on in a downward direction and the metal which rises to the surface 75 is very effectively freed of these impurities. The impurities continue to flow downward into contact with the sloping surfaces of the duct portion 56 and are directed towards the entrance to the helical duct 63. The conveyor 62 may be rotated intermittently or continuously and in either case the sedimentary impurities, together with a small amount of accompanying metal, is forced by reason of the screw action downward into the lower portion of the duct 54 from which they descend in the quiescent metal surrounding the baffle 68 and return to the bath.

Besides serving as a thermal barrier to suppress the flow of heat and thermal convection currents from the lower to the upper parts of the duct, and as a means for conveying impurities from the upper to the lower part of the duct, the conveyor may also be used to control the flow of heat from the bath to the metal in the upper part of the duct. When the conveyor rotates, it carries cool metal as well as impurities to the lower part of the duct and an equivalent amount of hot metal flows from the lower part up through duct 64 in the conveyor. By changing the speed of rotation of the conveyor, more or less hot metal may be admitted to the upper part of the duct in addition to the crude metal and the tempertaure of the metal in the upper part of the duct may be regulated thereby.

I prefer to use thermal insulation 65 and 85 to reduce the flow of heat from the hot ascending crude metal in duct 64 and from the salt bath to the cooler metal in which impurities are carried down in duct 63 by the conveyor.

I prefer not to chill the walls of the hopper 56 below the melting point of the metal as this would favor the formation of accretions. I may control the temperature of the walls by circulating hot air through the housing 72, or in place thereof I may circulate warm oil between the jacket 71 and the hopper 56. In either case, by suitably controlling the temperature of the wall of the upper part of the delivery duct, I suppress the formation of hard accretions on the inner surface.

I may surround the upper part of the delivery ducts shown in Figs. 1 to 6 and 9 with a housing similar to that shown in Figs. 7 and 8 and similarly control the temperature by circulating warm air therethrough.

There are advantages in removing the metal from the duct to the receiver at a position remote from the place where the metal rises, as where the receiver is on a side opposite the side of the duct where the metal rises, as shown in Figs. 1, 2 and 3, because this gives the metal a considerable lateral flow. I may, however, arrange the receiver on the same side of the duct where the metal rises as shown in Fig. 9. In this form of the invention the metal and gas enter the duct 92 through slit 93 and flow upward to baffle 94 which is in the shape of a trough being attached to the duct on the left side and along the upper edge. The rising metal flows over the outside of the baffle 94, enters the open side 95 near the top, and flows in the direction of the arrows around the inclined flat baffle 96. The precipitated impurities slide down baffle 94 and return along the right side of the duct. The thermal insulation 97 prevents chilling of the side of the duct along which the hot metal rises as shown by the arrows.

In those applications of the invention where no gas is admitted to the duct, the metal may be caused to flow up one side of the duct and down the opposite side of the duct by causing thermal dissymmetry on two sides of the duct. This may be done by applying thermal insulation to one side of the duct as shown in Figs. 1, 2, 3 and 9, for example, or by adding heat to one side of the duct as shown in Fig. 3. A thermal unbalance may also be caused by removing heat from one side of the duct more rapidly than from the opposite side.

I claim:

1. In a method of purifying a liquid light metal recovered from a mixed salt bath more dense than the metal, the improvement which comprises collecting the metal in a hood beneath the upper surface of the bath, passing the collected crude metal very slowly through a body of metal which is relatively quiescent and at a high temperature which permits the settling out of salt particles in a preliminary purification, passing the metal upward after the preliminary purification through a duct to a body of metal above the bath, the metal flowing along one side of the duct and across relatively cool and quiescent metal in the body where soluble impurities are precipitated, and returning the precipitated impurities to the bath in metal in the duct spaced to one side of the place where the metal rises in the duct.

2. Apparatus for the purification of a liquid light metal which comprises a vessel containing a fused salt bath, a metal collecting hood positioned beneath the upper surface of said bath, a duct connected to the hood and extending upward beyond the upper surface of the bath for confining a body of metal and removing it from the bath, a baffle depending below the duct in the hood to prevent the uncontrolled flow of metal and gas from the hood into the duct, said baffle having a small hole through which liquid metal and gas may flow in a stream into the duct, means causing the stream to flow upwardly along one side of the duct, means for preventing the wall of the duct above the bath along which the metal flows from becoming chilled, said duct being constructed and arranged to permit impurities to settle in metal to one side of the place where the stream of metal flows upwardly, and a receiver connected to the duct for receiving the purified metal.

3. Apparatus for the purification of a liquid light metal collected in a metal collecting hood beneath the upper surface of a fused salt bath which comprises a duct connected to the hood and extending upward beyond the upper surface of the bath for confining a body of metal and removing it from the bath, a baffle in the duct for directing the metal upward in a stream along only one part of the duct, the upper portion of the duct being enlarged to provide a relatively large upper surface for the metal, an outlet at the upper portion of the duct for flowing purified metal out of the duct, and baffle means in the enlarged part of the duct causing the metal of the stream to flow downward from the surface and then upward to the opening.

4. Apparatus for the purification of a liquid light metal collected in a metal collecting hood beneath the upper surface of a fused salt bath which comprises a duct connected to the hood and extending upward beyond the upper surface of the bath for confining a body of liquid metal and removing it from the bath, a baffle in the duct for directing the metal upward in a stream in a small confined portion of the duct, the upper portion of the duct being enlarged to provide a relatively large upper surface for the metal, an outlet at the upper portion of the duct for flowing purified metal out of the duct, a baffle at the top surface of the metal for causing metal from the stream to flow downward from the surface and then upward to the outlet opening.

5. Apparatus for the purification of a liquid light metal collected in a metal collecting hood beneath the upper surface of a fused salt bath which comprises a duct connected to the hood and extending upward beyond the upper surface of the bath for confining a body of liquid metal and removing it from the bath, the upper portion of the duct being in the form of a hopper, means for passing the metal in a stream through the central part of the hopper and across a part of the surface of metal in the hopper, and a baffle for reversing the flow of metal as it flows from the center to an outlet opening.

6. Apparatus for the purification of a liquid light metal collected in a metal collecting hood beneath the upper surface of a fused salt bath which comprises a duct connected to the hood and extending upward beyond the upper surface of the bath for confining a body of liquid metal and removing it from the bath, said duct extending below the top of the hood forming a baffle to prevent the uncontrolled flow of metal and accompanying gas from the hood into the duct, a small opening to the duct for directing the metal from the hood in a stream into one portion of the duct, means in the duct causing the stream of liquid metal to flow in a definite portion of the metal confined within the duct and another portion of metal in the duct spaced from the stream to remain relatively quiescent, means for controlling the temperature of the duct above the upper surface of the bath to prevent chilling thereof and the formation of accretions on its surface, and means permitting impurities separating from the rising stream of metal to enter the quiescent metal and return to the bath.

7. Apparatus for the purification of a liquid light metal which comprises a vessel containing a fused salt bath, a metal collecting hood positioned beneath the upper surface of said bath, a duct connected to the hood and extending upwardly beyond the upper surface of the bath for confining a body of liquid metal and removing it from the bath, said duct comprising a chamber for the preliminary purification of the metal, said chamber having upright sides and being considerably larger in cross sectional area than the portions of the duct thereabove, a baffle in the chamber for directing the metal into the larger part of the duct, means for directing the flow of metal upwardly from the chamber through a different portion of the duct, the upper portion of the duct above the chamber being provided with baffle means constructed and arranged to permit the upward passage of liquid metal in the form of a stream in one part of the duct and to maintain a quiescent body of metal off to one side of the stream through which impurities may settle and return to the bath, and a receiver connected to the duct for receiving the purified metal.

8. Apparatus for the purification of a liquid light metal collected in a metal collecting hood beneath the upper surface of a fused salt bath which comprises a duct connected to the hood and extending upward beyond the upper surface of the bath for confining a body of liquid metal and removing it from the bath, said duct extending upward from the hood at an angle inclined from the vertical, permitting the rising hot metal from the hood to flow in a stream along the upper surface of the duct, said duct having sufficient cross-sectional area that an appreciable body of quiescent metal is maintained along the under surface of the duct into which sedimentary impurities may settle from the rising stream of metal, and means operatively associated with the upper inclined surface of the duct to reduce the dissipation of heat therefrom and thereby to minimize the formation of accretions thereon.

9. Apparatus for the purification of a liquid light metal collected in a metal collecting hood beneath the upper surface of a fused salt bath which comprises a duct connected to the hood and extending upward beyond the upper surface of the bath for confining a body of liquid metal and removing it from the bath, said duct comprising a lower section having a baffle therein for directing the flow of metal from the hood in a stream into a central section of the duct through which the stream flows upward from the baffle, an upper section of the duct in the form of a hopper through which the stream of metal flows to the upper surface of the metal in the hopper, a second baffle in the hopper section embracing the upper surface of metal for causing the metal to flow radially from the upper surface, downward and then upward around the second baffle to a discharge opening of the hopper, and mechanical means for forcing metal and impurities therein back into the lower section of the duct from the hopper.

10. Apparatus according to claim 9 which comprises a conveyor rotatable in a cylinder having an exterior helical duct through which metal and impurities are forced downward from the hopper.

11. Apparatus for the purification of a liquid light metal collected in a metal collecting hood beneath the upper surface of a fused salt bath which comprises a duct connected to the hood and extending upward an appreciable distance beyond the upper surface of the bath for confining a body of liquid metal and removing it from the bath, said duct having a cross-sectional area throughout a major portion of its length which is relatively long and narrow, means for passing metal from the hood into the duct near one of the narrow sides, means for continuing the flow of metal upward along the said narrow side, and means for maintaining the metal in the duct along the opposite narrow side sufficiently quiescent that precipitated impurities settle therein and return to the bath.

12. A duct as defined in claim 9 which comprises means beneath the bath for preventing the transfer of heat from the bath into the metal in the duct.

13. A duct as defined in claim 11 which comprises means above the upper surface of the bath for preventing the side of the duct along which the stream rises from becoming chilled to a point where accretions form thereon.

14. Apparatus for the purification of a liquid light metal collected in a metal collecting hood beneath the upper surface of a fused salt bath which comprises a duct connected to the hood and extending upward beyond the upper surface of the bath for confining a body of liquid metal and removing it from the bath, means in the duct for returning precipitated impurities to the bath, means in the upper part of the duct for removing purified metal therefrom, and baffle means in the upper part of the duct for causing the metal to flow downward from the upper surface of the metal in the duct and then upward before it enters the means for removing the metal.

15. In a method of purifying a liquid light metal from a fused salt bath more dense than the metal in which the metal is collected under a hood beneath the upper surface of the bath and is pushed upwardly in a duct to a place above the upper surface of the bath by the pressure of the bath, the metal forming a column of metal in the duct, cooler than the bath, supported on the bath and discharging from the duct; the improvement which comprises passing the hot crude metal from the hood in a thin stream, relatively small in cross-sectional area compared to the cross-sectional area of the column, into the lower portion of the metal in the column, the hot crude metal, because of its lower density flowing upwardly in the column without substantially agitating the metal of the column to the side of the rising stream, the metal of the column to the side of the rising stream being cooler precipitating into it dissolved impurities from the metal in the rising stream at the interface between it and the rising stream, returning the precipitated impurities to the bath by sedimentation from the metal in the column, and discharging purified metal from the upper part of the column.

16. In a method of purifying a liquid light metal from a fused salt bath more dense than the metal in which the metal is collected under a hood beneath the upper surface of the bath and is pushed upwardly in a duct to a place above the upper surface of the bath by the pressure of the bath, the metal forming a column of metal in the duct, cooler than the bath, supported on the bath and discharging from the duct; the improvement which comprises passing the hot crude metal from the hood in a thin stream, relatively small in cross-sectional area compared to the cross-sectional area of the column, into the lower portion of the metal in the column and at one side thereof, the hot crude metal, because of its lower density, flowing upwardly in the column at one side thereof without substantially agitating the metal of the column to the side of the rising stream, the metal of the column to the side of the rising stream being cooler precipitating into it dissolved impurities from the metal in the rising stream at the interface between it and the rising stream, returning the precipitated impurities to the bath by sedimentation from the metal in the column, and discharging purified metal from the upper part of the column.

17. In a method of purifying a liquid light metal from a fused salt bath more dense than the metal in which the metal is collected under a hood beneath the upper surface of the bath and is pushed upwardly in a duct to a place above the upper surface of the bath by the pressure of the bath, the metal forming a column of metal in the duct, cooler than the bath, supported on the bath and discharging from the duct; the improvement which comprises passing the hot crude metal from the hood in a thin stream, relatively small in cross-sectional area compared to the cross-sectional area of the column, into the lower portion of the metal in the column, the hot crude metal, because of its lower density flowing upwardly in the column without substantially agitating the metal of the column to the side of the rising stream, the metal of the column to the side of the rising stream being cooler precipitating into it dissolved impurities from the metal in the rising stream at the interface between it and the rising stream, returning the precipitated impurities to the bath by sedimentation from the metal in the column, flowing the relatively hot metal from the rising stream across the upper part of the cooler metal of the column to cool the hot impure metal and thereby cause impurities dissolved therein to precipitate therefrom, returning the precipitated impurities to the bath by sedimentation, and discharging purified metal from the upper part of the column of metal.

18. In a method of purifying a liquid light metal from a fused salt bath more dense than the metal in which the metal is collected under a hood beneath the upper surface of the bath and is pushed upwardly in a duct to a place above the upper surface of the bath by the pressure of the bath, the metal forming a column of metal in the duct, cooler than the bath, supported on the bath and overflowing from the duct; the improvement which comprises passing the hot crude metal from the hood in a thin stream, relatively small in cross-sectional area compared to the cross-sectional area of the column, into the lower portion of the metal in the column, the hot crude metal, because of its lower density flowing upwardly in the column without substantially agitating the metal of the column to the side of the rising stream, the metal of the column to the side of the rising stream being cooler precipitating into it dissolved impurities from the metal in the rising stream at the interface between it and the rising stream, deflecting the rising stream of hot metal in the upper portion of the column to cause it to reverse its direction of flow and to flow in a downward direction in another part of the column to further cool the hot metal and to precipitate further amounts of impurities dissolved therein, returning precipitated impurities to the bath by sedimentation from the metal in the column, the reversing of the direction of flow of the hot metal facilitating such return of impurities to the bath, and discharging purified metal from the upper part of the column.

19. In the method of purifying a liquid light metal from a fused bath more dense than the metal, in which hot, crude metal is collected under a hood beneath the upper surface of the bath and is pushed upward from the hood in a duct to a place above the upper surface of the bath by the pressure of the bath, the metal forming a column of metal in the duct cooler than the bath and supported on the bath, impurities being precipitated from the metal in the column and the purified metal being discharged from the upper part of the column; the improvement which comprises controlling the passage of the hot, crude metal from the hood up through the column so that it flows in contact with the cooler metal of the column in a thin stream, relatively small in cross-sectional area compared to the cross-sectional area of the column, and directing the thin stream of crude metal away from the place where purified metal is discharging from the column to prevent the crude metal passing directly from the bath to the point of discharge of purified metal from the column.

ROBERT J. McNITT.

REFERENCES CITED

The following references are of record in the file of this patent:

UNITED STATES PATENTS

| Number | Name | Date |
| --- | --- | --- |
| 464,096 | Graban | Dec. 1, 1891 |
| 1,092,178 | Seward et al. | Apr. 7, 1914 |
| 1,839,756 | Grebe et al. | Jan. 5, 1932 |
| 1,845,266 | Griswold | Feb. 16, 1932 |
| 1,851,789 | Ward et al. | Mar. 29, 1932 |
| 1,930,195 | Eigenheer | Oct. 10, 1933 |
| 1,921,377 | Ward | Aug. 8, 1933 |
| 1,900,220 | Barstow | Mar. 7, 1933 |
| 2,068,681 | Hulse et al. | Jan. 26, 1937 |
| 2,111,264 | Gilbert | Mar. 15, 1938 |
| 2,054,316 | Gilbert | Sept. 15, 1936 |
| 2,390,115 | McNitt | Dec. 4, 1945 |

FOREIGN PATENTS

| Number | Country | Date |
| --- | --- | --- |
| 740,731 | France | Nov. 21, 1932 |